(12) United States Patent
Frishman et al.

(10) Patent No.: US 10,158,889 B2
(45) Date of Patent: Dec. 18, 2018

(54) REPLAYING OLD PACKETS FOR CONCEALING VIDEO DECODING ERRORS AND VIDEO DECODING LATENCY ADJUSTMENT BASED ON WIRELESS LINK CONDITIONS

(71) Applicant: INTEL CORPORATION, Santa Clara, CA (US)

(72) Inventors: Yaniv Frishman, Kiryat Ono (IL); Moshe Naaman, Petach Tiqwa (IL)

(73) Assignee: Intel Corporation, Santa Clara, CA (US)

( * ) Notice: Subject to any disclaimer, the term of this patent is extended or adjusted under 35 U.S.C. 154(b) by 746 days.

(21) Appl. No.: 14/671,382

(22) Filed: Mar. 27, 2015

(65) Prior Publication Data
US 2016/0227257 A1  Aug. 4, 2016

Related U.S. Application Data

(60) Provisional application No. 62/110,503, filed on Jan. 31, 2015, provisional application No. 62/110,505, filed on Jan. 31, 2015.

(51) Int. Cl.
| | | |
|---|---|---|
| *H04N 7/12* | (2006.01) | |
| *H04N 11/02* | (2006.01) | |
| *H04N 11/04* | (2006.01) | |
| *H04N 19/895* | (2014.01) | |
| *H04N 19/65* | (2014.01) | |
| *H04N 19/102* | (2014.01) | |
| *H04N 19/164* | (2014.01) | |
| *H04N 21/434* | (2011.01) | |
| *H04N 21/438* | (2011.01) | |

(Continued)

(52) U.S. Cl.
CPC ......... *H04N 19/895* (2014.11); *H04N 19/102* (2014.11); *H04N 19/164* (2014.11); *H04N 19/65* (2014.11); *H04N 21/4344* (2013.01); *H04N 21/4382* (2013.01); *H04N 21/44209* (2013.01); *H04N 19/46* (2014.11)

(58) Field of Classification Search
CPC .............................. H04N 19/895; H04N 19/65
See application file for complete search history.

(56) References Cited

U.S. PATENT DOCUMENTS

2003/0142752 A1*  7/2003  Demas ............. H04N 21/23608
                                                        375/240.27
2005/0232290 A1*  10/2005  Mathew ........... H04N 21/23406
                                                        370/412

(Continued)

FOREIGN PATENT DOCUMENTS

| JP | 2008-311784 A | 12/2008 |
|---|---|---|
| KR | 10-2008-0071725 A | 8/2008 |

OTHER PUBLICATIONS

International Search Report and Written Opinion for PCT/US2015/064609, dated Mar. 23, 2016, 10 pages.

(Continued)

*Primary Examiner* — Rebecca A Volentine
(74) *Attorney, Agent, or Firm* — Jordan IP Law, LLC

(57) ABSTRACT

Systems, apparatus, articles, and methods are described below including operations for replaying old packets for concealing video decoding errors as well as operations for video decoding latency adjustment based on wireless link conditions.

21 Claims, 12 Drawing Sheets

(51) Int. Cl.
*H04N 21/442* (2011.01)
*H04N 19/46* (2014.01)

(56) References Cited

U.S. PATENT DOCUMENTS

| | | | |
|---|---|---|---|
| 2006/0088107 A1* | 4/2006 | Cancemi | H04N 21/23608 375/240.27 |
| 2007/0033494 A1* | 2/2007 | Wenger | H04N 19/147 714/776 |
| 2010/0027679 A1* | 2/2010 | Sunahara | H04N 21/2381 375/240.24 |
| 2010/0158130 A1* | 6/2010 | Chen | H04N 19/70 375/240.25 |
| 2010/0195742 A1 | 8/2010 | Wu | |
| 2013/0039410 A1* | 2/2013 | Tan | H03M 13/05 375/240.02 |
| 2014/0096164 A1* | 4/2014 | Bei | H04N 19/46 725/81 |
| 2014/0119445 A1 | 5/2014 | Tan et al. | |
| 2014/0269917 A1* | 9/2014 | Van der Laan | H04N 19/105 375/240.16 |
| 2014/0269918 A1 | 9/2014 | van der Laan | |
| 2015/0281712 A1* | 10/2015 | Callahan | H04N 19/174 382/233 |

OTHER PUBLICATIONS

International Preliminary Report on Patentability for International Patent Application No. PCT/US2015/064609, dated Aug. 10, 2017, 7 pages.

* cited by examiner

Prior Art

IDENTIFY COMPLETE FRAME PORTIONS
802

STORE UNDECODED ACCUMULATED COMPLETE FRAME PORTIONS

804

IDENTIFY INCOMPLETE FRAME PORTIONS

806

REPLACE THE IDENTIFIED INCOMPLETE FRAME PORTIONS WITH THE STORED UNDECODED ACCUMULATED COMPLETE FRAME PORTIONS
808

DECODE THE CURRENT FRAME

810

REPLAYING OLD PACKETS FOR CONCEALING VIDEO DECODING ERRORS AND VIDEO DECODING LATENCY ADJUSTMENT BASED ON WIRELESS LINK CONDITIONS

RELATED APPLICATIONS

The present application claims the benefit of U.S. Provisional Application No. 62/110,503, filed 31 Jan. 2015, and titled "REPLAYING OLD PACKETS FOR CONCEALING VIDEO DECODING ERRORS" as well as U.S. Provisional Application No. 62/110,505, filed 31 Jan. 2015, and titled "VIDEO DECODING LATENCY ADJUSTMENT BASED ON WIRELESS LINK CONDITIONS, the contents of which are expressly incorporated herein in their entirety.

BACKGROUND

A video encoder compresses video information so that more information can be sent over a given bandwidth. The compressed signal may then be transmitted to a receiver that decodes or decompresses the signal prior to display.

In some conventional wireless display systems, video compression is used in order to reduce over the air bandwidth. Since the wireless medium is unreliable and some packets carrying compressed video can be lost, the decoder may implement error concealment. Existing error concealment implementations typically use a frame buffer, which may contain the previously decoded image. Missing parts of the image may be typically replaced with co-located parts of the previous image from the frame buffer.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

FIG. 8 is a flow diagram illustrating an example coding process;

DETAILED DESCRIPTION

Figure 1:
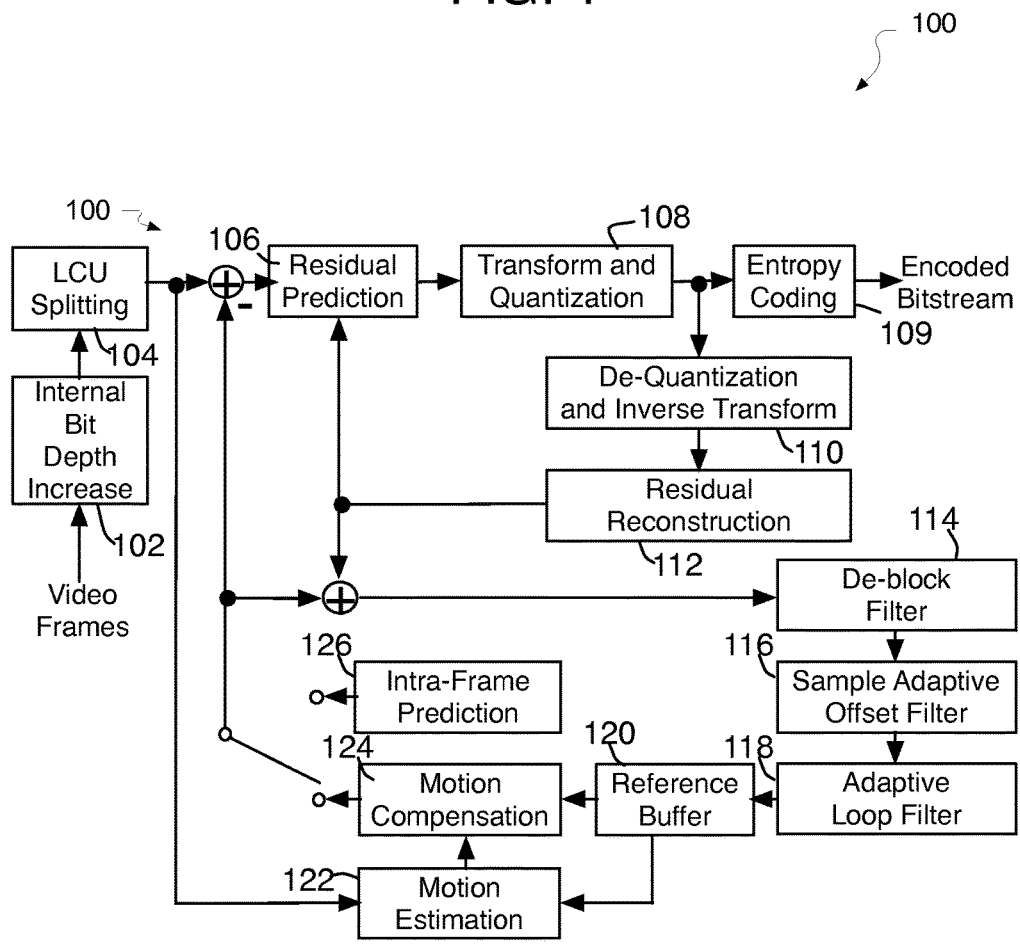
FIG. 1 is an illustrative diagram of an example video processing system.

While the following description sets forth various implementations that may be manifested in architectures such system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to effect such feature, structure, or characteristic in connection with other implementations whether or not explicitly described herein.

Systems, apparatus, articles, and methods are described below including operations for replaying old packets for concealing video decoding errors as well as operations for video decoding latency adjustment based on wireless link conditions.

As described above, in some conventional wireless display systems, video compression is used in order to reduce over the air bandwidth. Since the wireless medium is unreliable and some packets carrying compressed video can be lost, the decoder may implement error concealment. Existing error concealment implementations typically use a frame buffer, which may contain the previously decoded image.

Missing parts of the image may be typically replaced with co-located parts of the previous image from the frame buffer.

Further, some conventional solutions may typically use a frame buffer in order to store the previously decoded image. The buffer is large and is typically accessed with a high bandwidth. It is often located off-chip. This increases product cost and power consumption. In addition, known solutions often require designing a decoder, which can correctly handle missing packets. Such a decoder may be complex to implement and validate.

As will be described in more detail below, instead of using a frame buffer, some of the implementations described herein may utilize software to detect which parts of the image (e.g., at the slice level) are missing. Instead of using a frame buffer to make up the missing pixels, a co-located slice from a previous video frame may be re-decoded in order to conceal the missing packets. Thus, error concealment may be performed in the compressed packets domain, instead of in the uncompressed pixels domain.

In contrast to conventional solutions, some of the implementations described herein may not require a frame buffer, thus product cost and power consumption may be reduced. Some of the implementations described herein may not require a decoder that can handle missing packets. This may significantly simplify the decoder implementation (which may be done in HW) and validation, thus reducing project time line and risk. Some of the implementations described herein may be used to reduce complexity of a resulting WiGig system on chip, for example.

FIG. 1 is an illustrative diagram of an example video coding system 100, arranged in accordance with at least some implementations of the present disclosure. In various implementations, video coding system 100 may be configured to undertake video coding and/or implement video codecs according to one or more advanced video codec standards.

Further, in various embodiments, video coding system 100 may be implemented as part of an image processor, video processor, and/or media processor and may undertake inter prediction, intra prediction, predictive coding, and/or the like in accordance with the present disclosure.

As used herein, the term "coder" may refer to an encoder and/or a decoder. Similarly, as used herein, the term "coding" may refer to encoding via an encoder and/or decoding via a decoder. For example video encoders and video decoders as described herein (e.g., see FIG. 4) may both be examples of coders capable of coding.

In some examples, video coding system 100 may include additional items that have not been shown in FIG. 1 for the sake of clarity. For example, video coding system 100 may include a processor, a radio frequency-type (RF) transceiver, a display, and/or an antenna. Further, video coding system 100 may include additional items such as a speaker, a microphone, an accelerometer, memory, a router, network interface logic, etc. that have not been shown in FIG. 1 for the sake of clarity.

In some examples, during the operation of video coding system 100, current video information may be provided to an internal bit depth increase module 102 in the form of a frame of video data. The current video frame may be split into Largest Coding Units (LCUs) at module 104 and then passed to a residual prediction module 106. The output of residual prediction module 106 may be subjected to known video transform and quantization processes by a transform and quantization module 108. The output of transform and quantization module 108 may be provided to an entropy coding module 109 and to a de-quantization and inverse transform module 110. Entropy coding module 109 may output an entropy encoded bitstream 111 for communication to a corresponding decoder.

Within the internal decoding loop of video coding system 100, de-quantization and inverse transform module 110 may implement the inverse of the operations undertaken by transform and quantization module 108 to provide the output of residual prediction module 106 to a residual reconstruction module 112. Those skilled in the art may recognize that transform and quantization modules and de-quantization and inverse transform modules as described herein may employ scaling techniques. The output of residual reconstruction module 112 may be fed back to residual prediction module 106 and may also be provided to a loop including a de-blocking filter 114, a sample adaptive offset filter 116, an adaptive loop filter 118, a buffer 120, a motion estimation module 122, a motion compensation module 124 and an intra-frame prediction module 126. As shown in FIG. 1, the output of either motion compensation module 124 or intra-frame prediction module 126 is both combined with the output of residual prediction module 106 as input to de-blocking filter 114, and is differenced with the output of LCU splitting module 104 to act as input to residual prediction module 106.

As will be described in more detail below, instead of using a frame buffer, some of the implementations described herein may utilize software to detect which parts of the image (e.g., at the slice level) are missing. Instead of using a frame buffer to make up the missing pixels, a co-located slice from a previous video frame may be re-decoded in order to conceal the missing packets. Thus, error concealment may be performed in the compressed packets domain, instead of in the uncompressed pixels domain.

In contrast to conventional solutions, some of the implementations described herein may not require a frame buffer, thus product cost and power consumption may be reduced. Some of the implementations described herein may not require a decoder that can handle missing packets. This may significantly simplify the decoder implementation (which may be done in HW) and validation, thus reducing project time line and risk. Some of the implementations described herein may be used to reduce complexity of a resulting WiGig system on chip, for example.

As will be discussed in greater detail below, video coding system 100 may be used to perform some or all of the various functions discussed below in connection with FIGS. 3-4.

Figure 2:
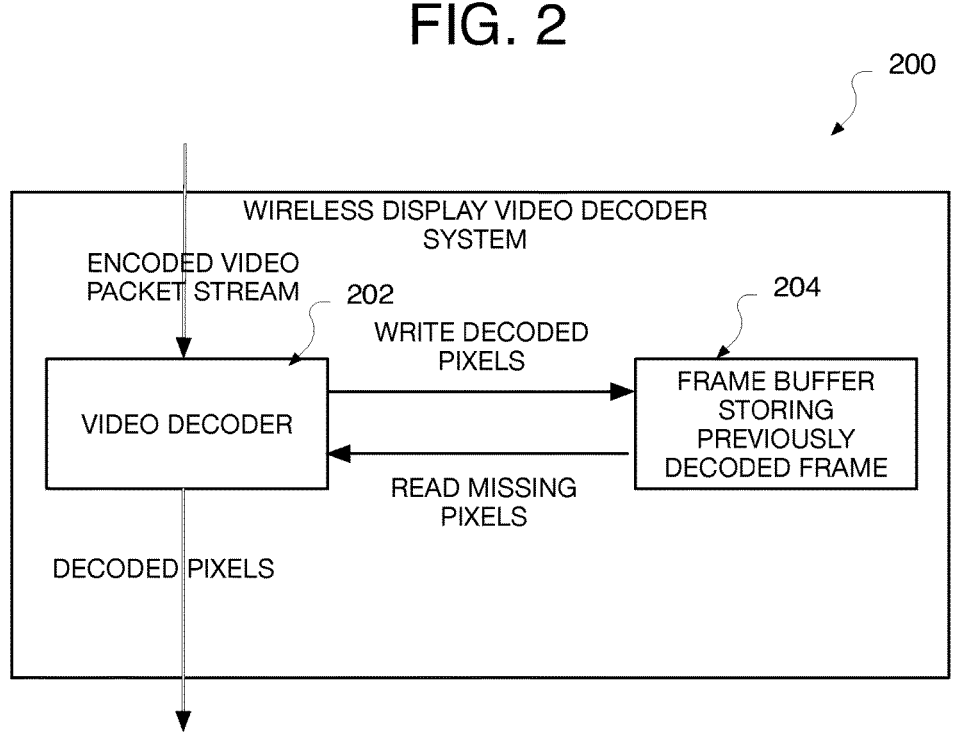
FIG. 2 is an illustrative diagram of an example Prior Art wireless display video decoder.

FIG. 2 is an illustrative diagram of an example Prior Art wireless display video decoder system 200.

As illustrated, in existing wireless display video decoder system 200, a stream of encoded video packets may be received and decoded pixels may be output. A frame buffer 204 may be used to store the previously decoded frame. When decoding, via video decoder 202, is successful, newly decoded pixels may be written in to the frame buffer. These can be used to conceal decoding errors in future video frames. When decoding fails due to missing/late arrival of packets, the corresponding missing pixels may be read from the frame buffer in order to conceal the error. A large, expensive, high-memory bandwidth, high power consumption memory may be used for implementing the frame buffer. The decoder must be designed to handle missing packets without failing.

Figure 3:
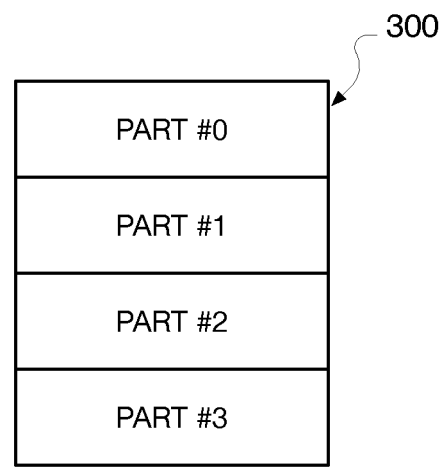
FIG. 3 is an illustrative diagram of an example video frame.

FIG. 3 is an illustrative diagram of an example video frame 300, arranged in accordance with at least some implementations of the present disclosure.

While existing implementations perform error concealment in the uncompressed (i.e., pixel) domain, various implementations described herein may perform error concealment in the compressed domain. In various implementations, video frame 300 may be split into one or more parts, where each video packet belongs to only one part. Each part can include an entire video frame, a single slice or several slices. In the illustration, video frame 300 may be split into four parts (e.g., slices), for example, each occupying several macro block rows.

Figure 4:
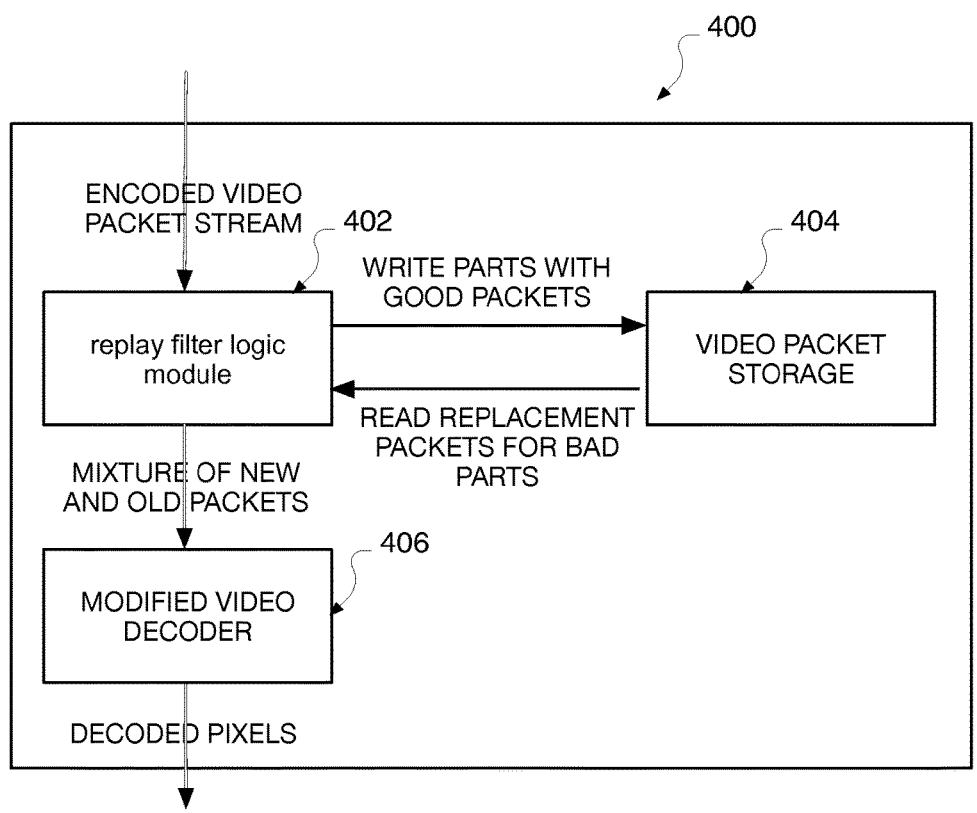
FIG. 4 is an illustrative diagram of an example wireless display video decoder system.

FIG. 4 is an illustrative diagram of an example wireless display video decoder system 400, arranged in accordance with at least some implementations of the present disclosure.

As illustrated, when packets are received, the software (e.g., replay filter logic module 402) controlling wireless display video decoder system 400 may determine which part the packet belongs. This can be done by information in packet headers, such as: WDE video frame number, PES packet data alignment indication (which is set when a new AVC slice starts), the first_mb_in_slice field of the slice header or additional proprietary information (generated by the encoder) contained in the packets, the like, and/or combinations thereof. When replay filter logic module 402 determines that all of the packets of a part of the image were correctly received, the packets may be sent for decoding via decoder 406 and also stored in the video packet storage 404 (to be used for error concealment). When replay filter logic module 402 determines that some packets were lost (or arrived after their presentation time), instead of sending the new packets (e.g., an incomplete part), the packets of the corresponding part that are stored in the video packet storage 404 may be sent for decoding. This ensures that the decoder 406 always receives a stream where no packets are missing. Thus the decoder 406 does not need to implement in hardware complex error concealment measures, nor is there a need to hold a frame buffer.

Simplifying the software implementation of this replay filter logic module 402 can be done by modifying wireless display video decoder 400 to support decoding of old packets, e.g., packets whose presentation time/sequence numbers are in the past. Detecting these packets in wireless display video decoder 400 can be done either by additional control meta-data passed to wireless display video decoder 400 or by modifying wireless display video decoder 400 to accept packets with old sequence numbers (e.g., the decoder may be modified in order to accept packets, even though they have old sequence numbers), and treat them as old packets and ignore their presentation time stamps (who are in the past, and in a regular decoder would not be decoded).

A sample application where such techniques can be implemented is the Intra only mode in WiGig display extension (WDE). Here, an image may be composed of many slices (between 1 and 16 slices per macroblock row) and all macroblocks may be intra macroblocks (encoded from scratch). Using intra only encoding means it is easy to replace a new slice that was received incomplete (e.g., missing packets) with the co-located slice from a previously decoded image. Also, slice starts may be aligned with WDE packet boundaries. In this configuration, it is possible to aggregate a few slices into a single part of the image, and simply replace missing intra encoded packets with the packets for the co-located region that were correctly received in the past.

The example implementation illustrated in FIG. 4 may include the idea of using compressed packets, rather than a frame buffer in order to conceal errors. This reduces implementation cost, complexity and shortens the development schedule.

The example implementation includes the idea of having the decoder identify old packets (replacing missing/late packets) by noting that the sequence number (e.g. WDE packet sequence number) of the packet is old (lower than the highest sequence number that was decoded). This simplifies the error concealment process: SW simply needs to send to the decoder the old packets. No explicit communication or synchronization between the SW and the decoder may be necessary.

Since SW ensures all slices sent to the decoder are intact (either all packets are new or all packets are old) the decoder does not need to implement complex error concealment needed in order to handle cases where some packets are missing/late. This significantly reduces the complexity of the decoder implementation and validation (usually implemented in HW). Also, it may be common in decoder implementations to wait until the start of the next video frame when there is a decoder error. Over a wireless link, this means that every missing/late packet will corrupt a significant part of the video frame, leading to a bad user experience.

When using this example implementation, SW controls the granularity of error concealment. In cases like WiGig WDE where the frame may be divided into many slices, the artifact will be much more localized (e.g., one slice).

Note that the idea mainly targets a codec where all slices are either Intra or P_skip slices. When the codec also supports P macro blocks (with non-zero residual/motion vector) the idea can still be utilized in order to avoid complex error concealment in the decoder. In this case, the SW can feed P_skip slices in case of slices with missing packets (which would require the decoder to handle errors if the techniques described herein are not used).

In order to help the SW controlling the decoder partition the packets into slices and then parts of a video frame, additional data may be conveyed in the WDE packet header. This data provides the following information: the slice number that the packet belongs to, a bit indicating if this is the first packet in the slice, a bit indicating if this is the last packet in the slice. Using this information, in addition to the WiGig WDE restriction that slice starts must be aligned to WDE packet boundary, enables continuing to decode new packets even if some parts of the screen were lost. This helps localize the impact of losing a packet in the wireless channel. The concept here is to add high level data about the stream in the header section, in such a way that SW, rather than the decoder, can easily obtain information about the contents of the packet (and use it to conceal errors).

As will be discussed in greater detail below, wireless display video decoder 400 (e.g., FIG. 4) may be used to perform some or all of the various functions discussed below in connection with FIGS. 8 and/or 9.

As will be discussed in greater detail below, the example implementation described in FIGS. 5-7 discuss an algorithm that may automatically balance between robustness and latency in wireless display video decoding.

Existing solutions often require the user at session startup (e.g., before the wireless display session starts) to choose between using a low latency/gaming mode which is typically less robust (e.g., more tears) and a high latency mode which is more robust (e.g., less/no tears on the decoded video).

The example implementation discussed below monitors the number of tears in the decoded video, and when the frequency of tears is too high, switch to a higher latency mode, with no tears. This may be done by adding an additional delay of one video frame, and always decode the last image that was received intact (e.g., an image received with no tears). When wireless link conditions improve the extra video frame latency may be removed. This example implementation may work without intervention from the user. For example, this implementation may adopt the latency on the fly according to wireless link conditions. This may give robust video under varying wireless link conditions, while minimizing latency. Low latency is often critical for wireless docking, where the user interacts with the computer over a wireless display link.

Figure 5:
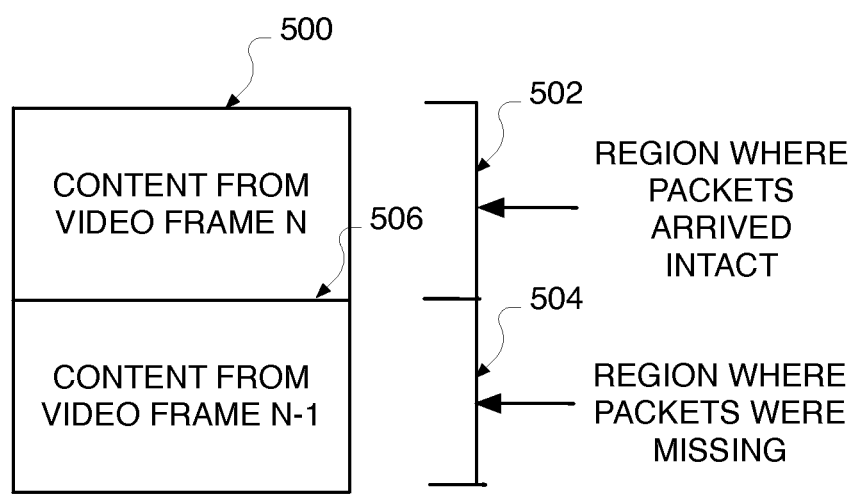
FIG. 5 is an example illustration of a torn video frame.

FIG. 5 is an example illustration of a torn video frame, arranged in accordance with at least some implementations of the present disclosure.

In wireless display systems there is a tradeoff between video robustness and latency. When a latency of less than a video frame is used, the decoder starts outputting a video frame before it is known if all of the packets corresponding to that video frame arrived intact to the decoder over the wireless link. When some packets are missing a tear occurs: where part of the decoded video frame 500 belongs to the newly received packets 502, while the rest (the part with the missing packets) is the result of error concealment 504. Often, error concealment means displaying the pixels from the previously received frame. This leads to an artifact called a tear 506 in the video frame 500, which is detectable and annoying.

In existing systems, in order to avoid tears in the displayed image 500, the user can select a more robust mode. In this mode, the decoder waits until all packets corresponding to each video frame are received intact, and only then starts decoding. This ensures there will be no tears 506, but means the end to end (encoder to decoder) latency is more than a video frame. High latency is annoying in interactive applications such as gaming and productivity work where eye-hand coordination and fast response to user interaction is required.

As will be discussed in more detail below, the example implementation discussed in FIGS. 6-7 contains two parts: a method to vary the latency dynamically, and mode decision logic that decides if to use low latency or high latency mode.

Figure 6:
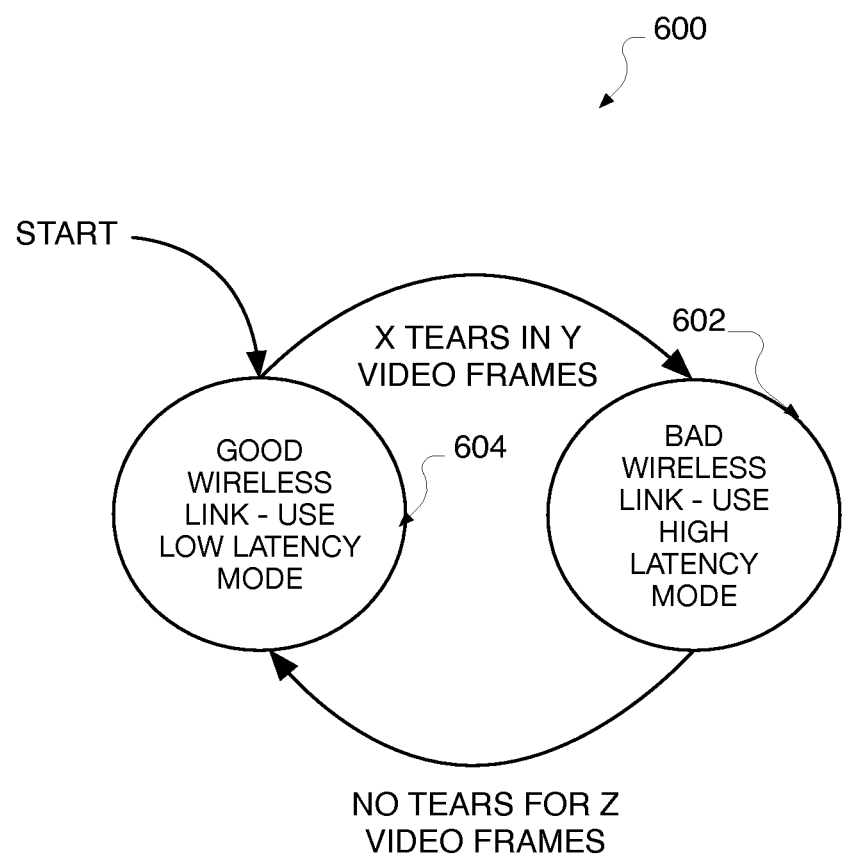
FIG. 6 illustrates an example implementation of mode decision logic.

FIG. 6 illustrates an example implementation of mode decision logic, arranged in accordance with at least some implementations of the present disclosure.

In the illustrated example, the system 600 typically starts in low latency mode. If more than X tears occur within Y video frames, the wireless link may be declared as bad at operation 602. The system then transitions to high latency mode, which may be robust. In this high latency mode there are no tears since only completely intact video frames are sent to the decoder. After Z video frames with no tears/missing packets are decoded, the wireless link may be declared as good. At that point the system transitions back to low latency mode at operation 604. The values of X, Y and Z may be established in advance and/or determined in real time depending on the use case.

Regarding frame tearing vs. frame duplication: in our experience (testing in the lab), people don't notice when several (e.g., 3) video frames are repeated. In contrast, people are able to detect even a single image with a tear or with missing pixels (e.g. a black part of an image due to missing packets will be detected by people as a flash in the image) inside a video sequence. Therefore, the proposed algorithm tries to minimize the number of images with tears.

In addition, by accumulating an entire intact video frame, and allowing extra end-to-end latency, there may be a better chance of avoiding frame duplications. While in low latency mode packets that arrive too late (e.g., after their planned decoding/presentation time) will cause a tear, when the latency is increased, there may be a higher chance the retransmission of packets will succeed, and the video frame will arrive later on, but intact.

In addition, in some wireless technologies (e.g., such as WiGig), when the wireless link deteriorates, the probability of a temporary outage of the link is increased. During these outages, the radio tries to improve link conditions by searching for better transmission parameters. The example implementation may automatically detect such cases and temporarily switch to high latency mode. In this mode, the link outages will be less noticeable (trading off late arrival of packets due to link outage with improved image robustness (less tears due to packets not arriving on time)). Regarding detection of the quality of the wireless link directly: what typically matters is how many packets were missing/arrived too late to be decoded and presented. This knowledge is not directly available to the wireless layer. For example, even if a packet is retransmitted several times, it can still be successfully received on time (avoiding a tear). In a second example, some packets that get dropped such as a packet containing a (redundant) sequence parameter set will not cause any issues in decoding, but if the wireless layer notices it is missing, it might mistakenly declare the link as bad.

Further, it is not always possible to detect the interactive nature of the task being used. However, such detection may be attempted with hints from the OS and/or application programs that may add significant complexity. It may not be possible in all cases (e.g., some legacy applications which do not supply this information). In addition, the example implementation may allow for reducing the latency (risking tears) even when the application requires robustness (no tears). This improves the user experience even though it overrides preexisting application requirements. Only when the link conditions are bad, and increasing the latency is needed, it is used. Without the example implementation, the user experience will be degraded since high latency/robust mode will be used more often, even when it is not necessary (since the link is good). Further, changing the latency may be done on the receiver (decoder) side, while detecting the nature of the task needs to be done on the transmitter (encoder) side, thus requiring additional control information to be sent if detection of the interactive nature of the task was to be used. Conversely, the example implementation discussed here may be implanted entirely in the receiver side, which may be simpler. The example implementation does not need any OS/application program hints.

Figure 7:
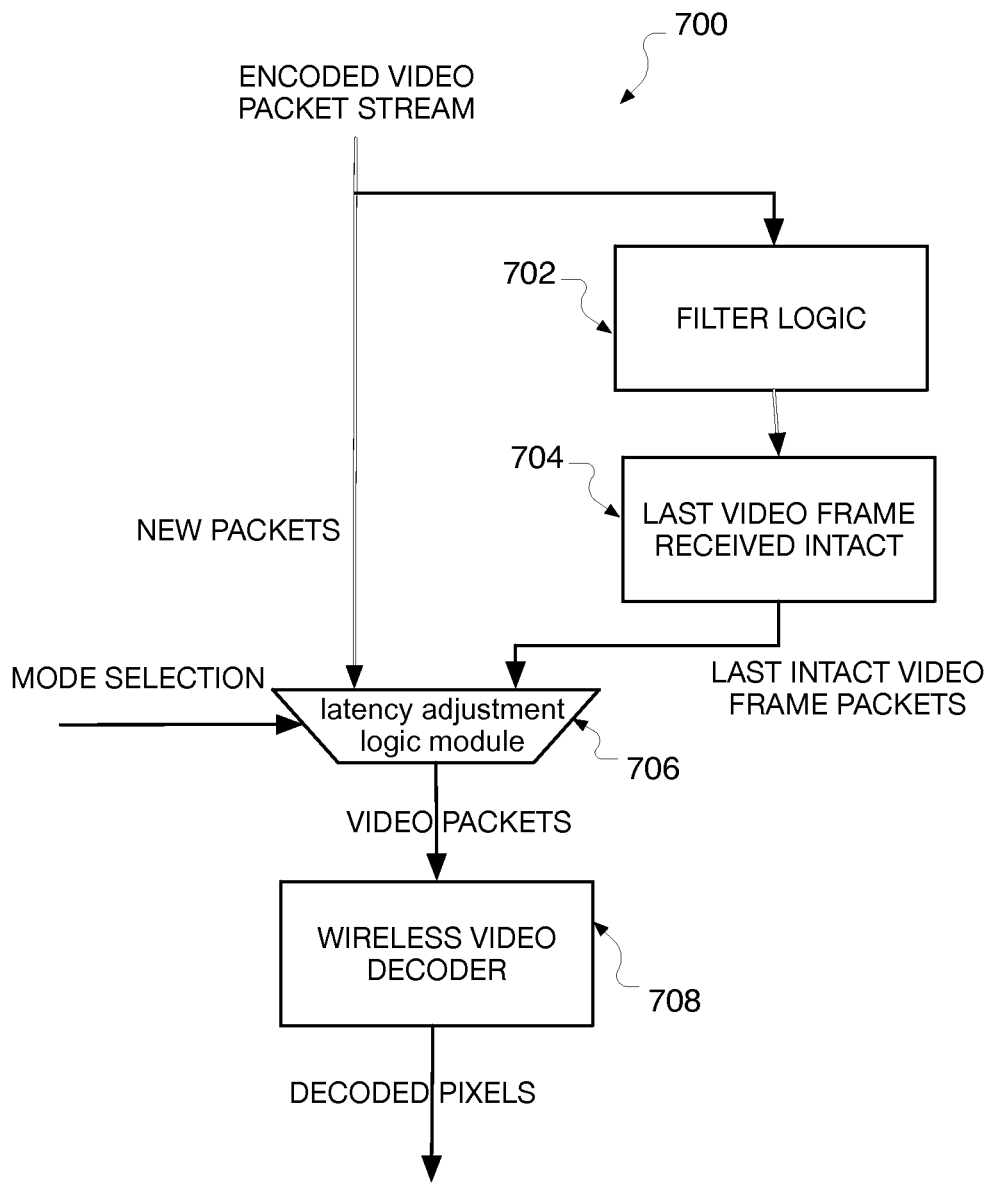
FIG. 7 shows an example implementation of latency variation system.

FIG. 7 shows an example implementation of how the end-to-end latency may be varied dynamically via wireless latency variation system 700, arranged in accordance with at least some implementations of the present disclosure.

In the illustrated example, when new packets are received, they are sent to the filter logic module 702, which accumulates a complete video frame where all packets are intact (and no packets are missing). Detecting that no packets are missing may be done by parsing meta-data the video packets contains such as the video frame number or looking for an indication, such as a presentation time on non-VCL packets indicating a new video frame started and no packets were lost (e.g. there may be no hole in the packet sequence numbers). The accumulated video frame may be stored in the "last video frame received intact" storage 704.

When low latency mode is active at packet source switching module 706, received packets are immediately decoded by the decoder 708. When robust/high latency mode is active at packet source switching module 706, the decoder 708 may be fed packets from the last video frame received intact memory 704. These are packets that are one or more video frames old. In order to decode such packets, whose presentation time is in the past, either the presentation time in the packets is modified before decoding, or the decoder 708 may be modified in order to support decoding of old packets. The decoder 708 can be put in a special mode allowing decoding of old packets by a signal (e.g., the mode selection signal generated by the logic described above).

As will be discussed in greater detail below, wireless display video decoder 400 (e.g., FIG. 4) and/or wireless latency variation system 700 (e.g., FIG. 7) may be used to perform some or all of the various functions discussed below in connection with FIGS. 8 and/or 9.

FIG. 8 is a flow diagram illustrating an example process 800, arranged in accordance with at least some implementations of the present disclosure. Process 800 may include one or more operations, functions or actions as illustrated by one or more of operations 802, etc.

Process 800 may begin at operation 802, "IDENTIFY COMPLETE FRAME PORTIONS", where at least portions of complete frames may be identified. For example, at least portions of complete frames may be identified from an undecoded packet stream, via a replay filter logic module.

Process 800 may continue at operation 804, "STORE UNDECODED ACCUMULATED COMPLETE FRAME PORTIONS", where at least a portion of the accumulated video frames may be stored. For example, at least a portion of the accumulated video frames may be stored as past undecoded packets in cases where the accumulated video frames to be stored are complete with no packets missing, via a storage memory.

Process 800 may continue at operation 806, "IDENTIFY INCOMPLETE FRAME PORTIONS", where at least portions of incomplete current frames may be identified. For example, at least portions of incomplete current frames may be identified from the undecoded packet stream, via the replay filter logic module.

Process 800 may continue at operation 808, "REPLACE THE IDENTIFIED INCOMPLETE FRAME PORTIONS WITH THE STORED UNDECODED ACCUMULATED COMPLETE FRAME PORTIONS", where the identified portions of incomplete frames may be replaced. For example, the identified portions of incomplete frames may be replaced with stored past undecoded packets corresponding to the identified portions of incomplete frames, via the replay filter logic module.

Process 800 may continue at operation 810, "DECODE THE CURRENT FRAME", where the current frames may be decoded. For example, the current frames may be decoded based at least in part on the replacement stored past undecoded packets, via a decoder.

Process 800 may provide for video coding, such as video encoding, decoding, and/or bitstream transmission techniques, which may be employed by a coder system as discussed herein.

Some additional and/or alternative details related to process 800 and other processes discussed herein may be illustrated in one or more examples of implementations discussed herein and, in particular, with respect to FIG. 9 below.

Figure 9:
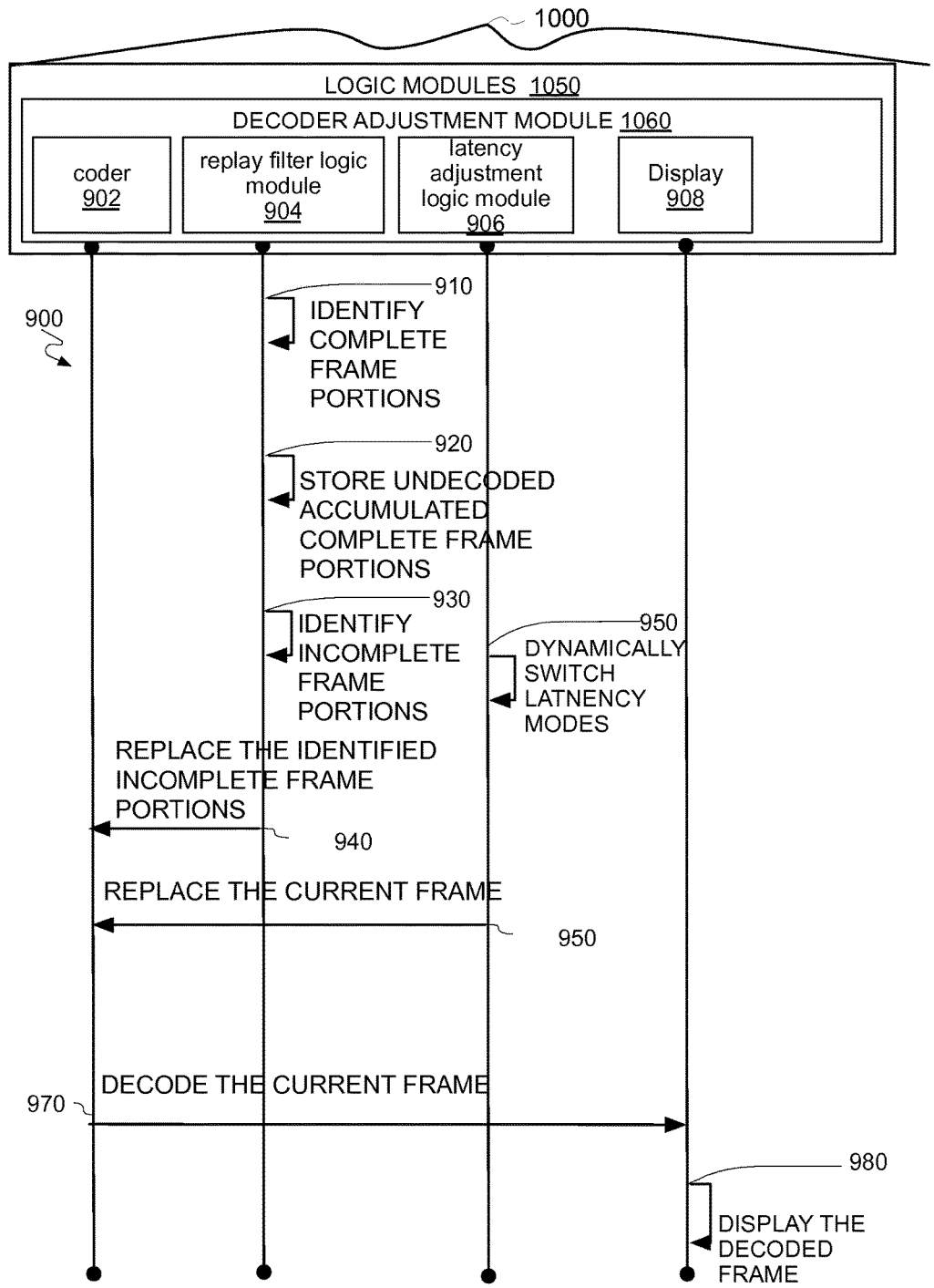
FIG. 9 provides an illustrative diagram of an example video coding system and video coding process in operation.

FIG. 9 provides an illustrative diagram of an example video coding system 1000 (see, e.g., FIG. 10 for more details) and video coding process 900 in operation, arranged in accordance with at least some implementations of the present disclosure. In the illustrated implementation, process 900 may include one or more operations, functions or actions as illustrated by one or more of actions 910, etc.

By way of non-limiting example, process 900 will be described herein with reference to example video coding system 1000 including coder 100 of FIG. 1, as is discussed further herein below with respect to FIG. 10. In various examples, process 900 may be undertaken by a system including both an encoder and decoder or by separate systems with one system employing an encoder (and optionally a decoder) and another system employing a decoder (and optionally an encoder). It is also noted, as discussed above, that an encoder may include a local decode loop employing a local decoder as a part of the encoder system.

As illustrated, video coding system 1000 (see, e.g., FIG. 10 for more details) may include logic modules 1050. For example, logic modules 1050 may include any modules as discussed with respect to any of the systems or subsystems described herein. For example, logic modules 850 may include a decoder adjustment logic module 1060, which may include replay filter logic module 904, latency adjustment logic module 906, and/or the like.

Process 900 may begin at operation 910, "IDENTIFY COMPLETE FRAME PORTIONS", where at least portions of complete frames may be identified. For example, at least portions of complete frames may be identified from an undecoded packet stream, via a replay filter logic module.

In some implementations of replay filter logic module 904, the received undecoded packet stream may include only intra coded frames, the received undecoded packet stream may have been received via an unreliable transmission medium (e.g., via WiGig or the like), and/or each frame may have one or more slices. Any of these factors, alone or in combination, may accentuate the efficacy of replay filter logic module 904.

Process 900 may continue at operation 920, "STORE UNDECODED ACCUMULATED COMPLETE FRAME PORTIONS", where at least a portion of the accumulated video frames may be stored. For example, at least a portion of the accumulated video frames may be stored as past undecoded packets in cases where the accumulated video frames to be stored are complete with no packets missing, via a storage memory.

In some implementations of replay filter logic module 904, the portions of complete frames may include complete slices received on time without missing packets.

Process 900 may continue at operation 930, "IDENTIFY INCOMPLETE FRAME PORTIONS", where at least portions of incomplete current frames may be identified. For example, at least portions of incomplete current frames may be identified from the undecoded packet stream, via the replay filter logic module.

In some implementations of replay filter logic module 904, the identification of which packets are missing from the incomplete current frame may be based at least in part one on or more of the following: a sequence number associated with each packet, a time stamp associated with select packets, a frame number associated with each packet, a slice number associated with each packet, the like, and/or combinations thereof.

Process 900 may continue at operation 940, "REPLACE THE IDENTIFIED INCOMPLETE FRAME PORTIONS", where the identified portions of incomplete frames may be replaced. For example, the identified portions of incomplete frames may be replaced with stored past undecoded packets corresponding to the identified portions of incomplete frames, via the replay filter logic module.

In some implementations of replay filter logic module 904, the identification of which packets from the stored past undecoded packets correspond with missing packets from the incomplete current frame may be based at least in part on one or more of the following: the sequence number associated with each packet, the time stamp associated with select packets, the frame number associated with each packet, the slice number associated with each packet, the like, and/or combinations thereof.

Additionally or alternatively, the replacement of the identified portions of incomplete frames with stored past undecoded packets may further include resetting the time stamp associated with the replacement past undecoded packets to disguise the replacement past undecoded packets as current packets (this operation is not illustrated in FIG. 9).

In parallel with operations 910-940 or instead of operations 910-940, Process 900 may proceed at operation 950, "DYNAMICALLY SWITCHING LATNENCY MODES", where a feed to the decoder may be switched between a low latency mode and a high latency mode. For example, a feed to the decoder may be switched between the incoming undecoded video packet stream and a stream of the stored past complete video frames. Such switching of the feed may be based at least in part on a transition between a low latency mode operation and a high latency mode operation, via a latency adjustment logic module.

For example, operations 910, 920, 930, 940 may be used in a low latency mode (where tears are possible). In situations where a high latency mode is being used, operations 910, 920, 930 may be used, but instead of operation 940 (e.g., error concealment by parts of old video frames), the SW may force decoding of a complete old video frame (e.g., the last video frame received intact).

In some implementations of latency adjustment logic module 906, the portions of complete frames may include complete frames received on time without missing packets.

In some implementations of latency adjustment logic module 906 the transition from a high latency mode to a low latency mode may be based at least in part on an unacceptable frequency of tears occurring.

In some implementations of latency adjustment logic module 906 the transition from a high latency mode to a low latency mode may be based at least in part on an acceptable frequency of tears occurring.

In some implementations of latency adjustment logic module 906 the transition from a low latency mode to a high latency mode may be based at least in part on detection of a wireless link outage.

In some implementations, the decision between low and high latency modes may be based on the frequency of tears. Such an implementations is sometimes better than directly monitoring link outages. However, monitoring link outages may be used in addition to or instead of monitoring frequency of tears in order to decide which latency mode should be used.

As part of operation 940, in addition to operation 940, or instead of operation 940, Process 900 may continue at operation 960, "REPLACE THE CURRENT FRAME", where the current frames may be replaced. For example, the current frames may be replaced with stored past undecoded packets corresponding to the current frames based at least in part on a transition between a low latency mode operation and a high latency mode operation, via a latency adjustment logic module.

Additionally or alternatively, the replacement of the current frames with stored past undecoded packets may further include ignoring, via the decoder, improper time stamps associated with the replacement past undecoded packets when operating in the high latency mode packets to disguise the replacement past undecoded packets as current packets (this operation is not illustrated in FIG. 9).

Process 900 may continue at operation 970, "DECODE THE CURRENT FRAME", where the current frames may be decoded. For example, the current frames may be decoded based at least in part on the replacement stored past undecoded packets, via a decoder.

Process 900 may continue at operation 980, "DISPLAY THE DECODED FRAME", where the current decoded frames may be displayed. For example, the current decoded frames may be displayed, via a display.

Some additional and/or alternative details related to process 900 and other processes discussed herein may be illustrated in one or more examples of implementations discussed herein and, in particular, with respect to FIG. 10 below.

Various components of the systems and/or processes described herein may be implemented in software, firmware, and/or hardware and/or any combination thereof. For example, various components of the systems and/or processes described herein may be provided, at least in part, by hardware of a computing System-on-a-Chip (SoC) such as may be found in a computing system such as, for example, a smart phone. Those skilled in the art may recognize that systems described herein may include additional components that have not been depicted in the corresponding figures.

As used in any implementation described herein, the term "module" may refer to a "component" or to a "logic unit", as these terms are described below. Accordingly, the term "module" may refer to any combination of software logic, firmware logic, and/or hardware logic configured to provide the functionality described herein. For example, one of ordinary skill in the art will appreciate that operations performed by hardware and/or firmware may alternatively be implemented via a software component, which may be embodied as a software package, code and/or instruction set, and also appreciate that a logic unit may also utilize a portion of software to implement its functionality.

As used in any implementation described herein, the term "component" refers to any combination of software logic and/or firmware logic configured to provide the functionality described herein. The software logic may be embodied as a software package, code and/or instruction set, and/or firmware that stores instructions executed by programmable circuitry. The components may, collectively or individually, be embodied for implementation as part of a larger system, for example, an integrated circuit (IC), system on-chip (SoC), and so forth.

As used in any implementation described herein, the term "logic unit" refers to any combination of firmware logic and/or hardware logic configured to provide the functionality described herein. The "hardware", as used in any implementation described herein, may include, for example, singly or in any combination, hardwired circuitry, programmable circuitry, state machine circuitry, and/or firmware that stores instructions executed by programmable circuitry. The logic units may, collectively or individually, be embodied as circuitry that forms part of a larger system, for example, an integrated circuit (IC), system on-chip (SoC), and so forth. For example, a logic unit may be embodied in logic circuitry for the implementation firmware or hardware of the systems discussed herein. Further, one of ordinary skill in the art will appreciate that operations performed by hardware and/or firmware may also utilize a portion of software to implement the functionality of the logic unit.

In addition, any one or more of the blocks of the processes described herein may be undertaken in response to instructions provided by one or more computer program products. Such program products may include signal bearing media providing instructions that, when executed by, for example, a processor may provide the functionality described herein. The computer program products may be provided in any form of computer readable medium. Thus, for example, a processor including one or more processor core(s) may undertake one or more operations in response to instructions conveyed to the processor by a computer readable medium.

Figure 10:
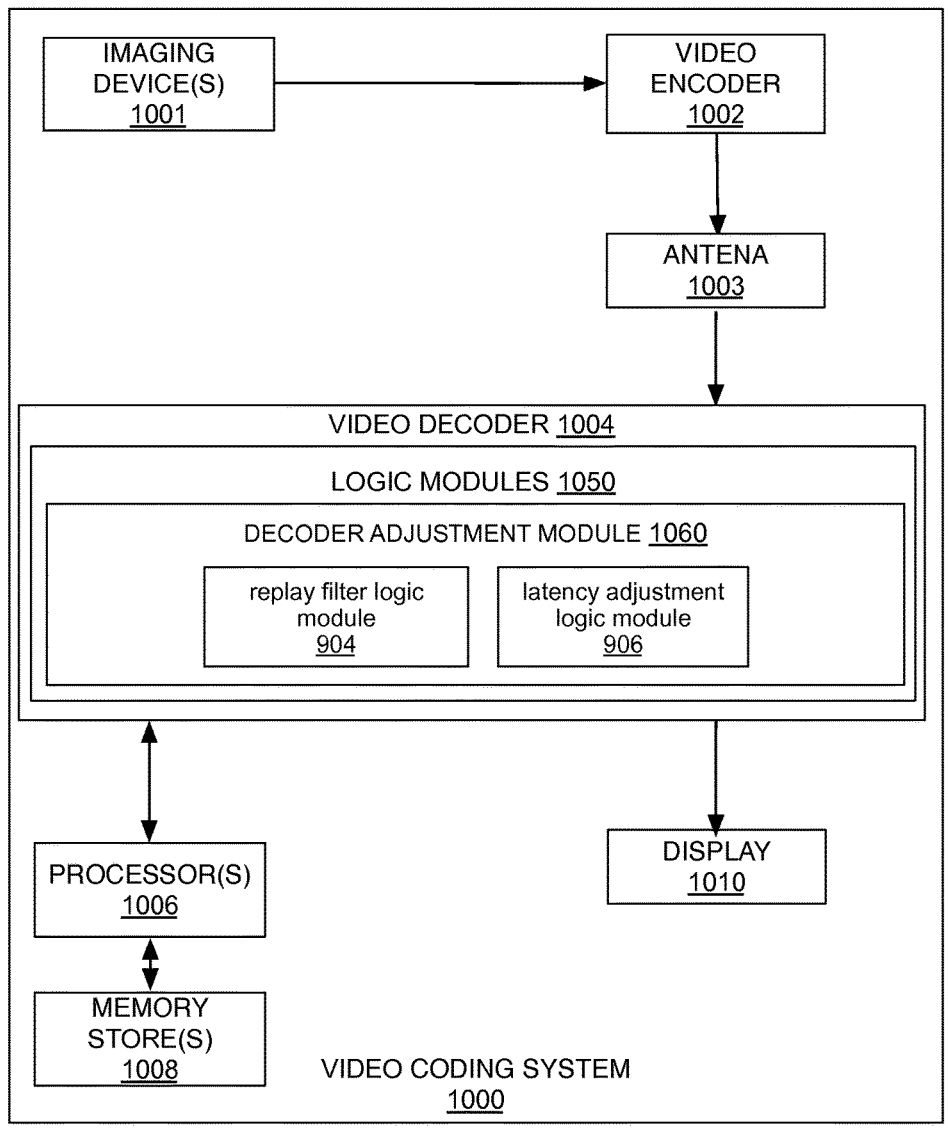
FIG. 10 is an illustrative diagram of an example video coding system.

FIG. 10 is an illustrative diagram of example video coding system 1000, arranged in accordance with at least some implementations of the present disclosure. In the illustrated implementation, video coding system 1000, although illustrated with both video encoder 1002 and video decoder 1004, video coding system 1000 may include only video encoder 1002 or only video decoder 1004 in various examples. Video coding system 1000 (which may include only video encoder 1002 or only video decoder 1004 in various examples) may include imaging device(s) 1001, an antenna 1002, one or more processor(s) 1006, one or more memory store(s) 1008, and/or a display device 1010. As illustrated, imaging device(s) 1001, antenna 1002, video encoder 1002, video decoder 1004, processor(s) 1006, memory store(s) 1008, and/or display device 1010 may be capable of communication with one another.

In some implementations, video coding system 1000 may include antenna 1003. For example, antenna 1003 may be configured to transmit or receive an encoded bitstream of video data, for example. Processor(s) 1006 may be any type of processor and/or processing unit. For example, processor(s) 1006 may include distinct central processing units, distinct graphic processing units, integrated system-on-a-chip (SoC) architectures, the like, and/or combinations thereof. In addition, memory store(s) 1008 may be any type of memory. For example, memory store(s) 1008 may be volatile memory (e.g., Static Random Access Memory (SRAM), Dynamic Random Access Memory (DRAM), etc.) or non-volatile memory (e.g., flash memory, etc.), and so forth. In a non-limiting example, memory store(s) 1008 may be implemented by cache memory. Further, in some implementations, video coding system 1000 may include display device 1010. Display device 1010 may be configured to present video data.

As shown, in some examples, video coding system 1000 may include logic modules 1050. While illustrated as being associated with video decoder 1004, video encoder 1002 may similarly be associated with identical and/or similar logic modules as the illustrated logic modules 1050. Accordingly, video decoder 1004 may include all or portions of logic modules 1050. For example, antenna 1003, video decoder 1004, processor(s) 1006, memory store(s) 1008, and/or display 1010 may be capable of communication with one another and/or communication with portions of logic modules 1050. Similarly, video encoder 1002 may include identical and/or similar logic modules to logic modules 1050. For example, imaging device(s) 1001 and video encoder 1002 may be capable of communication with one another and/or communication with logic modules that are identical and/or similar to logic modules 1050.

In some implementations, logic modules 1050 may embody various modules as discussed with respect to any system or subsystem described herein. In various embodiments, some of logic modules 1050 may be implemented in hardware, while software may implement other logic modules. For example, in some embodiments, some of logic modules 1050 may be implemented by application-specific integrated circuit (ASIC) logic while other logic modules may be provided by software instructions executed by logic such as processors 1006. However, the present disclosure is not limited in this regard and some of logic modules 1050 may be implemented by any combination of hardware, firmware and/or software.

For example, logic modules 1050 may include a decoder adjustment module 1060 and/or the like configured to implement operations of one or more of the implementations described herein.

Figure 11:
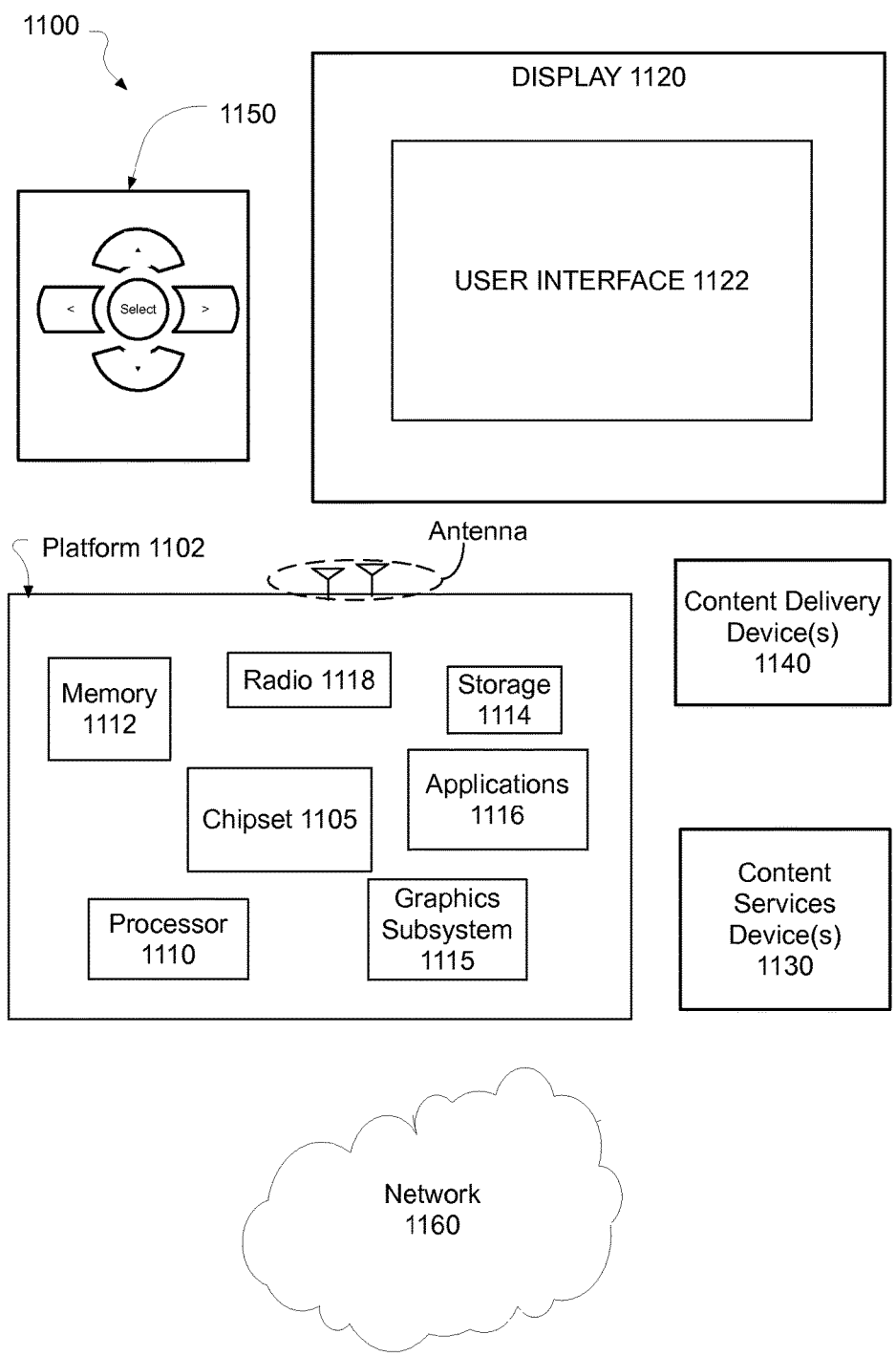
FIG. 11 is an illustrative diagram of an example system.

FIG. 11 is an illustrative diagram of an example system 1100, arranged in accordance with at least some implementations of the present disclosure. In various implementations, system 1100 may be a media system although system 1100 is not limited to this context. For example, system 1100 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, cameras (e.g. point-and-shoot cameras, super-zoom cameras, digital single-lens reflex (DSLR) cameras), and so forth.

In various implementations, system 1100 includes a platform 1102 coupled to a display 1120. Platform 1102 may receive content from a content device such as content services device(s) 1130 or content delivery device(s) 1140 or other similar content sources. A navigation controller 1150 including one or more navigation features may be used to interact with, for example, platform 1102 and/or display 1120. Each of these components is described in greater detail below.

In various implementations, platform 1102 may include any combination of a chipset 1105, processor 1110, memory 1112, antenna 1113, storage 1114, graphics subsystem 1115, applications 1116 and/or radio 1118. Chipset 1105 may provide intercommunication among processor 1110, memory 1112, storage 1114, graphics subsystem 1115, applications 1116 and/or radio 1118. For example, chipset 1105 may include a storage adapter (not depicted) capable of providing intercommunication with storage 1114.

Processor 1110 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 1110 may be dual-core processor(s), dual-core mobile processor(s), and so forth.

Memory 1112 may be implemented as a volatile memory device such as, but not limited to, a Random Access Memory (RAM), Dynamic Random Access Memory (DRAM), or Static RAM (SRAM).

Storage 1114 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1114 may include technology to increase the storage performance enhanced protection for valuable digital media when multiple hard drives are included, for example.

Graphics subsystem 1115 may perform processing of images such as still or video for display. Graphics subsystem 1115 may be a graphics processing unit (GPU) or a visual processing unit (VPU), for example. An analog or digital interface may be used to communicatively couple graphics subsystem 1115 and display 1120. For example, the interface may be any of a High-Definition Multimedia Interface, Display Port, wireless HDMI, and/or wireless HD compliant techniques. Graphics subsystem 1115 may be integrated into processor 1110 or chipset 1105. In some implementations, graphics subsystem 1115 may be a stand-alone device communicatively coupled to chipset 1105.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 1118 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1118 may operate in accordance with one or more applicable standards in any version.

In various implementations, display 1120 may include any television type monitor or display. Display 1120 may include, for example, a computer display screen, touch screen display, video monitor, television-like device, and/or a television. Display 1120 may be digital and/or analog. In various implementations, display 1120 may be a holographic display. Also, display 1120 may be a transparent surface that may receive a visual projection. Such projections may convey various forms of information, images, and/or objects. For example, such projections may be a visual overlay for a mobile augmented reality (MAR) application. Under the control of one or more software applications 1116, platform 1102 may display user interface 1122 on display 1120.

In various implementations, content services device(s) 1130 may be hosted by any national, international and/or independent service and thus accessible to platform 1102 via the Internet, for example. Content services device(s) 1130 may be coupled to platform 1102 and/or to display 1120. Platform 1102 and/or content services device(s) 1130 may be coupled to a network 1160 to communicate (e.g., send and/or receive) media information to and from network 1160. Content delivery device(s) 1140 also may be coupled to platform 1102 and/or to display 1120.

In various implementations, content services device(s) 1130 may include a cable television box, personal computer, network, telephone, Internet enabled devices or appliance capable of delivering digital information and/or content, and any other similar device capable of unidirectionally or bidirectionally communicating content between content providers and platform 1102 and/display 1120, via network 1160 or directly. It will be appreciated that the content may be communicated unidirectionally and/or bidirectionally to and from any one of the components in system 1100 and a content provider via network 1160. Examples of content may include any media information including, for example, video, music, medical and gaming information, and so forth.

Content services device(s) 1130 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1102 may receive control signals from navigation controller 1150 having one or more navigation features. The navigation features of controller 1150 may be used to interact with user interface 1122, for example. In various embodiments, navigation controller 1150 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 1150 may be replicated on a display (e.g., display 1120) by movements of a pointer, cursor, focus ring, or other visual indicators displayed on the display. For example, under the control of software applications 1116, the navigation features located on navigation controller 1150 may be mapped to virtual navigation features displayed on user interface 1122. In various embodiments, controller 1150 may not be a separate component but may be integrated into platform 1102 and/or display 1120. The present disclosure, however, is not limited to the elements or in the context shown or described herein.

In various implementations, drivers (not shown) may include technology to enable users to instantly turn on and off platform 1102 like a television with the touch of a button after initial boot-up, when enabled, for example. Program logic may allow platform 1102 to stream content to media adaptors or other content services device(s) 1130 or content delivery device(s) 1140 even when the platform is turned "off." In addition, chipset 1105 may include hardware and/or software support for (5.1) surround sound audio and/or high definition (7.1) surround sound audio, for example. Drivers may include a graphics driver for integrated graphics platforms. In various embodiments, the graphics driver may comprise a peripheral component interconnect (PCI) Express graphics card.

In various implementations, any one or more of the components shown in system 1100 may be integrated. For example, platform 1102 and content services device(s) 1130 may be integrated, or platform 1102 and content delivery device(s) 1140 may be integrated, or platform 1102, content services device(s) 1130, and content delivery device(s) 1140 may be integrated, for example. In various embodiments, platform 1102 and display 1120 may be an integrated unit. Display 1120 and content service device(s) 1130 may be integrated, or display 1120 and content delivery device(s) 1140 may be integrated, for example. These examples are not meant to limit the present disclosure.

In various embodiments, system 1100 may be implemented as a wireless system, a wired system, or a combination of both. When implemented as a wireless system, system 1100 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1100 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1102 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 11.

Figure 12:
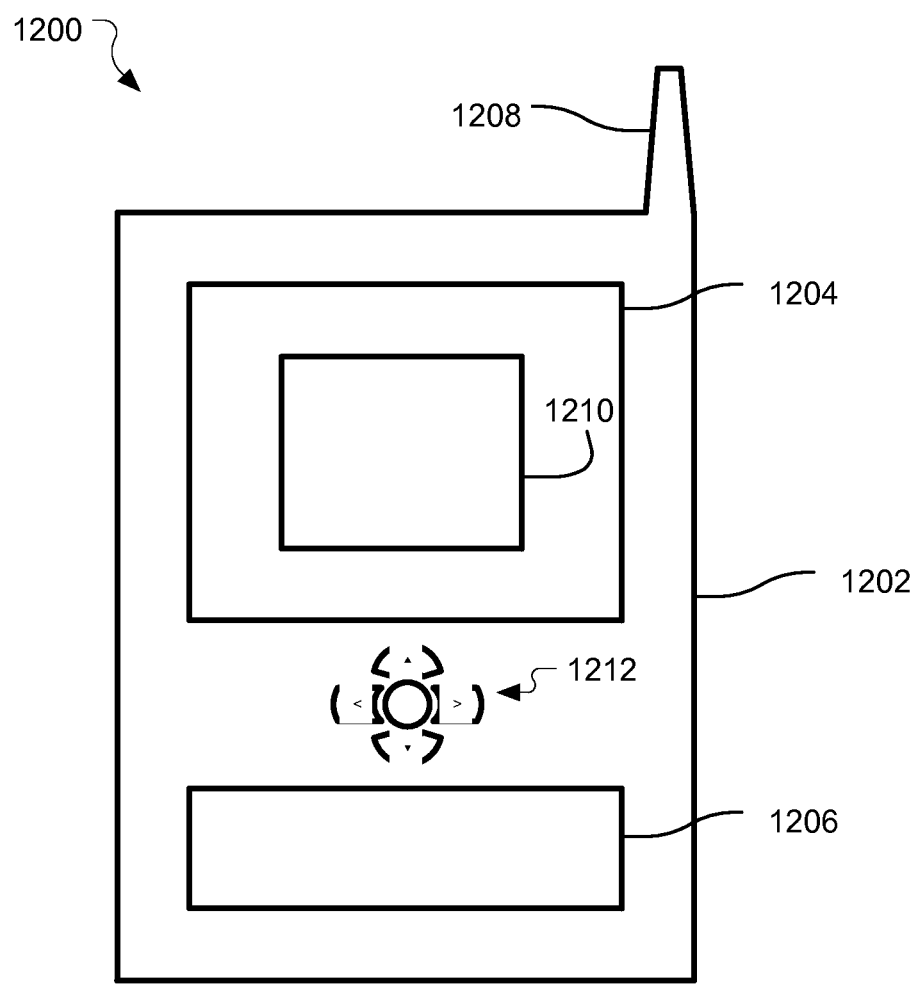
FIG. 12 is an illustrative diagram of an example system, all arranged in accordance with at least some implementations of the present disclosure.

As described above, system 1100 may be embodied in varying physical styles or form factors. FIG. 12 illustrates implementations of a small form factor device 1200 in which system 1200 may be embodied. In various embodiments, for example, device 1200 may be implemented as a mobile computing device a having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, cameras (e.g. point-and-shoot cameras, super-zoom cameras, digital single-lens reflex (DSLR) cameras), and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 12, device 1200 may include a housing 1202, a display 1204 which may include a user interface 1210, an input/output (I/O) device 1206, and an antenna 1208. Device 1200 also may include navigation features 1212. Display 1204 may include any suitable display unit for displaying information appropriate for a mobile computing device. I/O device 1206 may include any suitable I/O device for entering information into a mobile computing device. Examples for I/O device 1206 may include an alphanumeric keyboard, a numeric keypad, a touch pad, input keys, buttons, switches, rocker switches, microphones, speakers, voice recognition device and software, image sensors, and so forth. Information also may be entered into device 1200 by way of microphone (not shown). Such information may be digitized by a voice recognition device (not shown). The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more processor core(s) may undertake one or more of the operations of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the systems as discussed herein.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to further embodiments.

In one example, a computer-implemented method for video decoding wireless display may include identifying, via a replay filter logic module, at least portions of complete frames from an undecoded packet stream. A storage memory may store at least a portion of the accumulated video frames as past undecoded packets in cases where the accumulated video frames to be stored are complete with no packets missing. The replay filter logic module may identify at least portions of incomplete current frames from the undecoded packet stream. The replay filter logic module may replace the identified portions of incomplete frames with stored past undecoded packets corresponding to the identified portions of incomplete frames. A decoder may decode the current frames based at least in part on the replacement stored past undecoded packets.

In another example, in a computer-implemented method for video decoding wireless display, the received undecoded packet stream may include only intra coded frames. The received undecoded packet stream was received via an unreliable transmission medium. Each frame may have over one or more slices. The at least portions of complete frames include complete slices received on time without missing packets. The replay filter logic module may identify which packets are missing from the incomplete current frame based at least in part one on or more of the following: a sequence number associated with each packet, a time stamp associated with select packets, a frame number associated with each packet, and/or a slice number associated with each packet. The replay filter logic module may identify which packets from the stored past undecoded packets correspond with missing packets from the incomplete current frame based at least in part on one or more of the following: the sequence number associated with each packet, the time stamp associated with select packets, the frame number associated with each packet, and/or the slice number associated with each packet. The replacement of the identified portions of incomplete frames with stored past undecoded packets may further include resetting the time stamp associated with the replacement past undecoded packets to disguise the replacement past undecoded packets as current packets.

In another example, in a computer-implemented method for video decoding wireless display, the at least portions of complete frames include complete frames received on time without missing packets. A latency adjustment logic module may switch a feed to the decoder between the incoming undecoded video packet stream and a stream of the stored past complete video frames, where the switching of the feed is based at least in part on a transition between a low latency mode operation and a high latency mode operation. The latency adjustment logic module may transition from a low latency mode to a high latency mode based at least in part on an unacceptable frequency of tears occurring. The latency adjustment logic module may transition from the high latency mode to the low latency mode based at least in part on an acceptable frequency of tears occurring. The latency adjustment logic module may transition from a low latency mode to a high latency mode based at least in part on detection of a wireless link outage. The decoder may ignore improper time stamps associated with the replacement past undecoded packets when operating in the high latency mode packets to disguise the replacement past undecoded packets as current packets.

In another example, in a computer-implemented method for video decoding wireless display, the received undecoded packet stream may include only intra coded frames. The received undecoded packet stream was received via an unreliable transmission medium. Each frame may have over one or more slices. The at least portions of complete frames include complete slices received on time without missing packets. The replay filter logic module may identify which packets are missing from the incomplete current frame based at least in part one on or more of the following: a sequence number associated with each packet, a time stamp associated with select packets, a frame number associated with each packet, and/or a slice number associated with each packet. The replay filter logic module may identify which packets from the stored past undecoded packets correspond with missing packets from the incomplete current frame based at least in part on one or more of the following: the sequence number associated with each packet, the time stamp associated with select packets, the frame number associated with each packet, and/or the slice number associated with each packet. The replacement of the identified portions of incomplete frames with stored past undecoded packets may further include resetting the time stamp associated with the replacement past undecoded packets to disguise the replacement past undecoded packets as current packets.

In other examples, a computer-implemented system for video decoding wireless display may include a replay filter logic module configured to identify at least portions of complete frames from an undecoded packet stream. A storage memory may be configured to store at least a portion of the accumulated video frames as past undecoded packets in cases where the accumulated video frames to be stored are complete with no packets missing. The replay filter logic module may be further configured to identify at least portions of incomplete current frames from the undecoded packet stream. The replay filter logic module may be further configured to replace the identified portions of incomplete frames with stored past undecoded packets corresponding to the identified portions of incomplete frames. A decoder may be configured to decode the current frames based at least in part on the replacement stored past undecoded packets.

In another example, in the computer-implemented system for video decoding wireless display, the at least portions of complete frames include complete frames received on time without missing packets. A latency adjustment logic module may be configured to switch a feed to the decoder between the incoming undecoded video packet stream and a stream of the stored past complete video frames, where the switching of the feed is based at least in part on a transition between a low latency mode operation and a high latency mode operation. The latency adjustment logic module may be further configured to transition from a low latency mode to a high latency mode based at least in part on an unacceptable frequency of tears occurring. The latency adjustment logic module may be further configured to transition from the high latency mode to the low latency mode based at least in part on an acceptable frequency of tears occurring. The latency adjustment logic module may be further configured to transition from a low latency mode to a high latency mode based at least in part on detection of a wireless link outage. The decoder may be further configured to ignore improper time stamps associated with the replacement past undecoded packets when operating in the high latency mode packets to disguise the replacement past undecoded packets as current packets.

In a further example, at least one machine readable medium may include a plurality of instructions that in response to being executed on a computing device, causes the computing device to perform the method according to any one of the above examples.

In a still further example, an apparatus may include means for performing the methods according to any one of the above examples.

The above examples may include specific combination of features. However, such the above examples are not limited in this regard and, in various implementations, the above examples may include the undertaking only a subset of such features, undertaking a different order of such features, undertaking a different combination of such features, and/or undertaking additional features than those features explicitly listed. For example, all features described with respect to the example methods may be implemented with respect to the example apparatus, the example systems, and/or the example articles, and vice versa.

What is claimed:

1. A computer-implemented method for video decoding wireless display, comprising:
    identifying, via a replay filter logic module, at least portions of complete frames from an undecoded packet stream;
    storing, via a storage memory, at least a portion of accumulated video frames as past undecoded packets in cases where the accumulated video frames to be stored are complete with no packets missing;
    identifying, via the replay filter logic module, at least portions of incomplete current frames from the undecoded packet stream;
    replacing, via the replay filter logic module, the identified portions of incomplete frames with stored past undecoded packets corresponding to the identified portions of incomplete frames; and
    decoding, via a decoder, the current frames based at least in part on the replacement stored past undecoded packets;
    wherein the replacement of the identified portions of incomplete frames with stored past undecoded packets further comprises: resetting a time stamp associated with the replacement past undecoded packets to disguise the replacement past undecoded packets as current packets.

2. The method of claim 1,
    wherein the received undecoded packet stream includes only intra coded frames;
    wherein the received undecoded packet stream was received via an unreliable transmission medium;
    wherein each frame has over one or more slices.

3. The method of claim 1, wherein the at least portions of complete frames include complete slices received on time without missing packets.

4. The method of claim 1, further comprising:
    identifying, via the replay filter logic module, which packets are missing from the incomplete current frame based at least in part on one or more a sequence number associated with each packet; and
    identifying, via the replay filter logic module, which packets from the stored past undecoded packets correspond with missing packets from the incomplete current frame based at least in part on the sequence number associated with each packet.

5. The method of claim 1, further comprising:
    identifying, via the replay filter logic module, which packets are missing from the incomplete current frame based at least in part one on or more of the following: a sequence number associated with each packet, a time stamp associated with select packets, a frame number associated with each packet, and/or a slice number associated with each packet; and
    identifying, via the replay filter logic module, which packets from the stored past undecoded packets correspond with missing packets from the incomplete current frame based at least in part on one or more of the following: the sequence number associated with each packet, the time stamp associated with select packets, the frame number associated with each packet, and/or the slice number associated with each packet.

6. The method of claim 1, further comprising:
    wherein the received undecoded packet stream includes only intra coded frames;
    wherein the received undecoded packet stream was received via an unreliable transmission medium;
    wherein each frame has over one or more slices;
    wherein the at least portions of complete frames include complete slices received on time without missing packets;
    identifying, via the replay filter logic module, which packets are missing from the incomplete current frame based at least in part one on or more of the following: a sequence number associated with each packet, a time stamp associated with select packets, a frame number associated with each packet, and/or a slice number associated with each packet; and
    identifying, via the replay filter logic module, which packets from the stored past undecoded packets correspond with missing packets from the incomplete current frame based at least in part on one or more of the following: the sequence number associated with each packet, the time stamp associated with select packets, the frame number associated with each packet, and/or the slice number associated with each packet.

7. The method of claim 1, further comprising:
    wherein the at least portions of complete frames include complete frames received on time without missing packets; and
    switching, via a latency adjustment logic module, a feed to the decoder between the incoming undecoded video packet stream and a stream of the stored past complete video frames, wherein the switching of the feed is based at least in part on a transition between a low latency mode operation and a high latency mode operation.

8. The method of claim 1, further comprising:
    wherein the at least portions of complete frames include complete frames received on time without missing packets;
    switching, via a latency adjustment logic module, a feed to the decoder between the incoming undecoded video packet stream and a stream of the stored past complete video frames, wherein the switching of the feed is based at least in part on a transition between a low latency mode operation and a high latency mode operation;
    transitioning, via the latency adjustment logic module, from a low latency mode to a high latency mode based at least in part on an unacceptable frequency of tears occurring;
    transitioning, via the latency adjustment logic module, from the high latency mode to the low latency mode based at least in part on an acceptable frequency of tears occurring; and
    transitioning, via the latency adjustment logic module, from a low latency mode to a high latency mode based at least in part on detection of a wireless link outage.

9. The method of claim 1, further comprising:
wherein the at least portions of complete frames include complete frames received on time without missing packets;
switching, via a latency adjustment logic module, a feed to the decoder between the incoming undecoded video packet stream and a stream of the stored past complete video frames, wherein the switching of the feed is based at least in part on a transition between a low latency mode operation and a high latency mode operation; and
ignoring, via the decoder, improper time stamps associated with the replacement past undecoded packets when operating in the high latency mode packets to disguise the replacement past undecoded packets as current packets.

10. The method of claim 1, further comprising:
wherein the at least portions of complete frames include complete frames received on time without missing packets;
switching, via a latency adjustment logic module, a feed to the decoder between the incoming undecoded video packet stream and a stream of the stored past complete video frames, wherein the switching of the feed is based at least in part on a transition between a low latency mode operation and a high latency mode operation;
transitioning, via the latency adjustment logic module, from a low latency mode to a high latency mode based at least in part on an unacceptable frequency of tears occurring;
transitioning, via the latency adjustment logic module, from the high latency mode to the low latency mode based at least in part on an acceptable frequency of tears occurring;
transitioning, via the latency adjustment logic module, from a low latency mode to a high latency mode based at least in part on detection of a wireless link outage; and
ignoring, via the decoder, improper time stamps associated with the replacement past undecoded packets when operating in the high latency mode packets to disguise the replacement past undecoded packets as current packets.

11. A computer-implemented system for video decoding wireless display, comprising:
a replay filter logic module configured to identify at least portions of complete frames from an undecoded packet stream;
a storage memory configured to store at least a portion of accumulated video frames as past undecoded packets in cases where the accumulated video frames to be stored are complete with no packets missing;
the replay filter logic module further configured to identify at least portions of incomplete current frames from the undecoded packet stream;
the replay filter logic module further configured to replace the identified portions of incomplete frames with stored past undecoded packets corresponding to the identified portions of incomplete frames; and
a decoder configured to decode the current frames based at least in part on the replacement stored past undecoded packets;
wherein the replacement of the identified portions of incomplete frames with stored past undecoded packets further comprises: resetting a time stamp associated with the replacement past undecoded packets to disguise the replacement past undecoded packets as current packets.

12. The system of claim 11, further comprising:
the replay filter logic module further configured to identify which packets are missing from the incomplete current frame based at least in part on one or more a sequence number associated with each packet; and
the replay filter logic module further configured to identify which packets from the stored past undecoded packets correspond with missing packets from the incomplete current frame based at least in part on the sequence number associated with each packet.

13. The system of claim 11, further comprising:
the replay filter logic module further configured to identify which packets are missing from the incomplete current frame based at least in part one on or more of the following: a sequence number associated with each packet, a time stamp associated with select packets, a frame number associated with each packet, and/or a slice number associated with each packet; and
the replay filter logic module further configured to identify which packets from the stored past undecoded packets correspond with missing packets from the incomplete current frame based at least in part on one or more of the following: the sequence number associated with each packet, the time stamp associated with select packets, the frame number associated with each packet, and/or the slice number associated with each packet.

14. The system of claim 11, further comprising:
wherein the received undecoded packet stream includes only intra coded frames;
wherein the received undecoded packet stream was received via an unreliable transmission medium;
wherein each frame has over one or more slices;
wherein the at least portions of complete frames include complete slices received on time without missing packets;
the replay filter logic module further configured to identify which packets are missing from the incomplete current frame based at least in part one on or more of the following: a sequence number associated with each packet, a time stamp associated with select packets, a frame number associated with each packet, and/or a slice number associated with each packet; and
the replay filter logic module further configured to identify which packets from the stored past undecoded packets correspond with missing packets from the incomplete current frame based at least in part on one or more of the following: the sequence number associated with each packet, the time stamp associated with select packets, the frame number associated with each packet, and/or the slice number associated with each packet.

15. The system of claim 11, further comprising:
wherein the at least portions of complete frames include complete frames received on time without missing packets; and
a latency adjustment logic module configured to switch a feed to the decoder between the incoming undecoded video packet stream and a stream of the stored past complete video frames, wherein the switching of the feed is based at least in part on a transition between a low latency mode operation and a high latency mode operation.

16. The system of claim 11, further comprising:
wherein the at least portions of complete frames include complete frames received on time without missing packets;
a latency adjustment logic module configured to switch a feed to the decoder between the incoming undecoded video packet stream and a stream of the stored past complete video frames, wherein the switching of the feed is based at least in part on a transition between a low latency mode operation and a high latency mode operation;
the latency adjustment logic module further configured to transition from a low latency mode to a high latency mode based at least in part on an unacceptable frequency of tears occurring;
via the latency adjustment logic module further configured to transition from the high latency mode to the low latency mode based at least in part on an acceptable frequency of tears occurring; and
the latency adjustment logic module further configured to transition from a low latency mode to a high latency mode based at least in part on detection of a wireless link outage.

17. The system of claim 11, further comprising:
wherein the at least portions of complete frames include complete frames received on time without missing packets;
a latency adjustment logic module configured to switch a feed to the decoder between the incoming undecoded video packet stream and a stream of the stored past complete video frames, wherein the switching of the feed is based at least in part on a transition between a low latency mode operation and a high latency mode operation; and
the decoder further configured to ignore improper time stamps associated with the replacement past undecoded packets when operating in the high latency mode packets to disguise the replacement past undecoded packets as current packets.

18. The system of claim 11, further comprising:
wherein the at least portions of complete frames include complete frames received on time without missing packets;
a latency adjustment logic module configured to switch a feed to the decoder between the incoming undecoded video packet stream and a stream of the stored past complete video frames, wherein the switching of the feed is based at least in part on a transition between a low latency mode operation and a high latency mode operation;
the latency adjustment logic module further configured to transition from a low latency mode to a high latency mode based at least in part on an unacceptable frequency of tears occurring;
the latency adjustment logic module further configured to transition from the high latency mode to the low latency mode based at least in part on an acceptable frequency of tears occurring; and
the latency adjustment logic module further configured to transition from a low latency mode to a high latency mode based at least in part on detection of a wireless link outage; and
the decoder further configured to ignore improper time stamps associated with the replacement past undecoded packets when operating in the high latency mode packets to disguise the replacement past undecoded packets as current packets.

19. At least one non-transitory machine readable medium comprising:
a plurality of instructions that in response to being executed on a computing device, causes the computing device to perform:
identify at least portions of complete frames from an undecoded packet stream;
store at least a portion of accumulated video frames as past undecoded packets in cases where the accumulated video frames to be stored are complete with no packets missing;
identify at least portions of incomplete current frames from the undecoded packet stream;
replace the identified portions of incomplete frames with stored past undecoded packets corresponding to the identified portions of incomplete frames; and
decode the current frames based at least in part on the replacement stored past undecoded packets;
wherein the replacement of the identified portions of incomplete frames with stored past undecoded packets further comprises: resetting a time stamp associated with the replacement past undecoded packets to disguise the replacement past undecoded packets as current packets.

20. The at least one non-transitory machine readable medium method of claim 19, further comprising:
wherein the received undecoded packet stream includes only intra coded frames;
wherein the received undecoded packet stream was received via an unreliable transmission medium;
wherein each frame has over one or more slices;
wherein the at least portions of complete frames include complete slices received on time without missing packets;
identify which packets are missing from the incomplete current frame based at least in part one on or more of the following: a sequence number associated with each packet, a time stamp associated with select packets, a frame number associated with each packet, and/or a slice number associated with each packet; and
identify which packets from the stored past undecoded packets correspond with missing packets from the incomplete current frame based at least in part on one or more of the following: the sequence number associated with each packet, the time stamp associated with select packets, the frame number associated with each packet, and/or the slice number associated with each packet.

21. The at least one non-transitory machine readable medium method of claim 19, further comprising:
wherein the at least portions of complete frames include complete frames received on time without missing packets;
switch a feed to the decoder between the incoming undecoded video packet stream and a stream of the stored past complete video frames, wherein the switching of the feed is based at least in part on a transition between a low latency mode operation and a high latency mode operation;
transition from a low latency mode to a high latency mode based at least in part on an unacceptable frequency of tears occurring;
transition from the high latency mode to the low latency mode based at least in part on an acceptable frequency of tears occurring; and transition from a low latency mode to a high latency mode based at least in part on detection of a wireless link outage; and ignore improper time stamps associated with the replacement past undecoded packets when operating in the high latency mode packets to disguise the replacement past undecoded packets as current packets.

* * * * *